June 21, 1932.  B. A. KINSEY  1,864,442
INDICATOR FOR PHOTOGRAPHIC DEVICES
Filed June 22, 1929   2 Sheets-Sheet 2
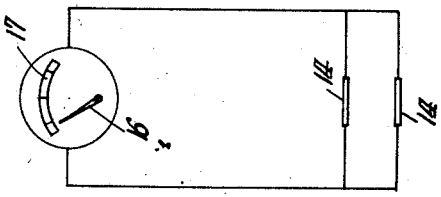
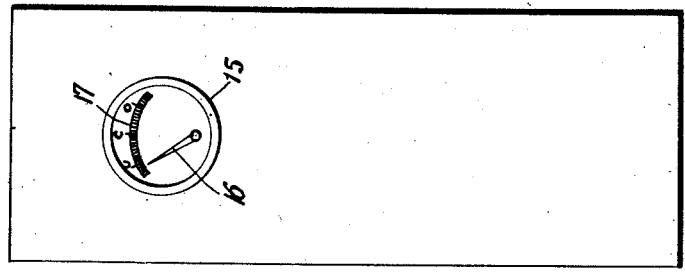
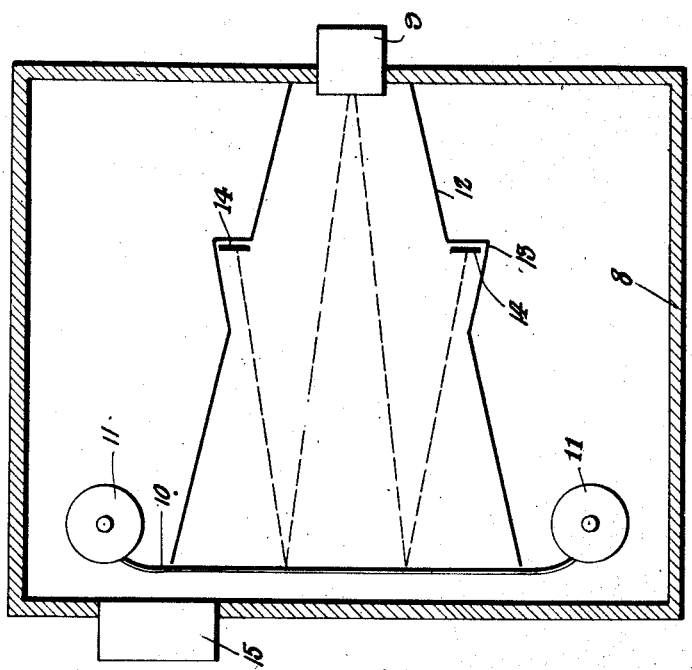
Bevey A. Kinsey,
INVENTOR
BY Victor J. Evans
ATTORNEY Patented June 21, 1932

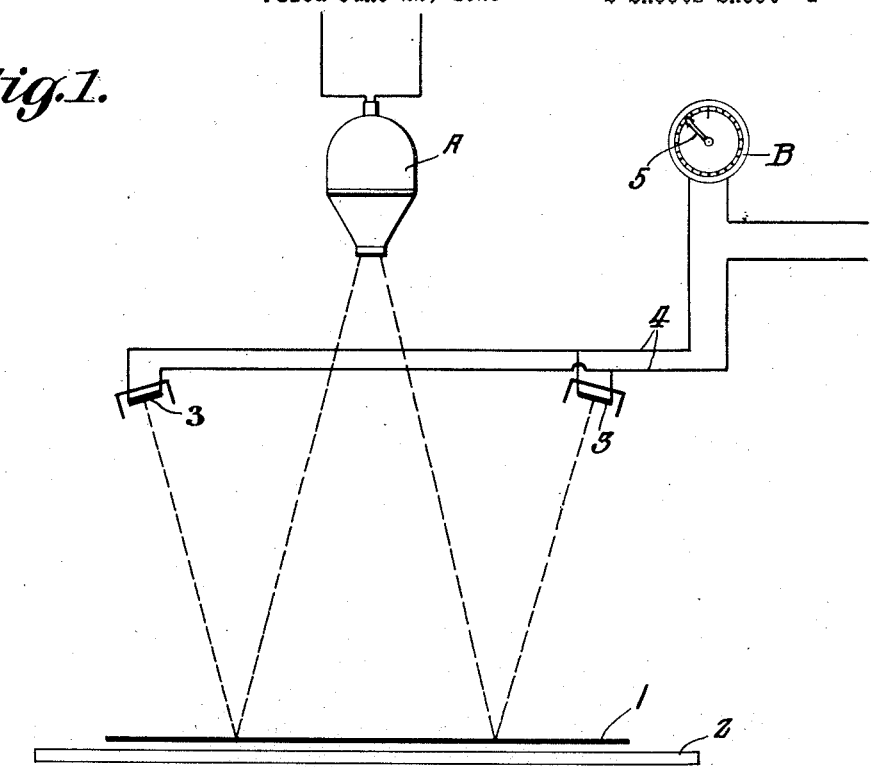
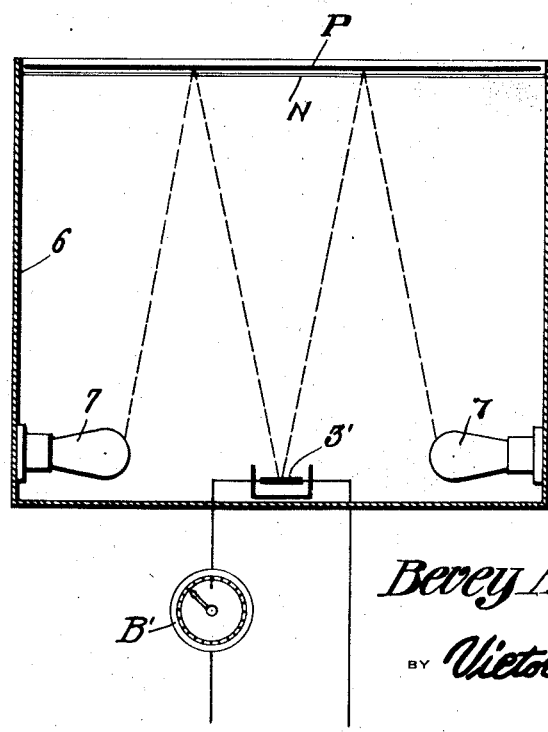

1,864,442

UNITED STATES PATENT OFFICE

BEVEY A. KINSEY, OF DALTON, GEORGIA

INDICATOR FOR PHOTOGRAPHIC DEVICES

Application filed June 22, 1929. Serial No. 372,936.

This invention relates to an indicator for photographic devices, the general object of the invention being to provide means for electrically indicating when the proper exposure has been made so as to eliminate guesswork in making exposures.

A very important object of the invention is to provide an electrically operated device which will indicate when the proper amount of light is admitted through the lens of a camera, of either the still or motion picture variety for making the proper exposure so that the operator may be enabled to adjust the usual adjustable diaphragm properly to bring about the desired satisfactory results.

A more specific object of the invention is to provide an indicating device for cameras which is electrically operated for giving a visible indication of the light strength and which is actuated by means of a current set up by light reflected from the emulsion of the film onto suitable photo-electric cells.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a diagrammatic view showing the invention used with an enlarger or projection printer.

Figure 2 is a similar view showing the invention in use in a contact printer.

Figure 3 is a diagrammatic sectional view showing the invention used with a camera.

Figure 4 is a rear view of the camera.

Figure 5 is a diagrammatic view of the circuit of the device used with the camera.

Referring to Figure 1, the letter A indicates a projection printer or enlarger containing a source of light and the negative from which an enlargement is to be made, and the numeral 1 indicates the photographic paper or other sensitized medium on which the positive is to be printed. The support for the paper is shown at 2. A motor driven meter B has a number of selenium cells 3 arranged in its circuit 4 and these cells are so arranged that the rays of light passing through the negative in the device A and through the lens of such device and striking the paper 1, will be reflected to said cells, whereby said cells will control the flow of current to the meter and cause the finger 5 of the meter to rotate over the dial at a speed depending upon the intensity of the light rays striking the cells. For instance, if a thin negative be placed in the projector device A, more light will be projected upon the paper and reflected to the cells than if a thick or dense negative be placed in the projector device. In other words, the amount of light reflected to the cells controls the speed of the motor driven meter. The motor is so geared to the pointer or finger that one revolution of the finger will indicate correct exposure.

Figure 2 shows a contact printer and comprises a casing 6 having the lamps 7 therein, with means in the top of the casing for supporting the negative N and the paper P so that the rays of light passing through the negative will print a positive on the paper. The rays of light striking the negative and paper are reflected upon the cell 3' which is arranged in the circuit of the meter B', so that the movement of the finger of the meter is controlled by the intensity of the light striking the cell, as explained above.

Figures 3, 4 and 5 show the invention applied to a camera, the casing of which is shown at 8, the lens barrel at 9, and the reels for the film 10 at 11. The barrel 9 contains the usual shutter and adjustable diaphragm. The bellows 12 is formed with the recesses 13 in which are placed cells 14, these cells being so placed that the light rays striking the film 10 will be reflected on to the cells. These cells produce a small electrical current which is carried by suitable conductors to the galvanometer or micro-ammeter 15, the finger 16 of which registers the current on the dial 17. This dial or scale can be marked in terms of exposure, that is, under exposure, correct exposure and over exposure. The cells 14 may be of any suitable material, such as the photo-voltaic type and either argentite or molybdenite, though any material having the property of converting light into electric energy may be used.

In an operation of this form of the invention it will be seen that light entering the camera through the barrel 9 which contains the lens, shutter and usual diaphragm will be reflected from the emulsion of the film 10 onto the photo-electric cells 14 which are connected in parallel with the meter 15. This generates a small electric current which passing through the meter will be registered thereon, the pointer 16 movable over the scale 17 indicating the number of milliamperes. If the amount of current registered is too high the operator will know at once that too much light is entering the camera and may then make the necessary adjustment of the diaphragm. Conversely, if the amount of current registered is below a certain limit the operator will know that insufficient light is entering and may then increase the size of the diaphragm opening.

Thus it will be seen that it is simply necessary for one to watch the meter to ascertain when the proper exposure has been made, it being understood that the finger 16 will be moved according to the amount of light striking the cells 14.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a photographic camera containing a film to be exposed and having a light admitting entrance, a meter, and photo-electric cells located within the camera in position to be influenced by light entering the camera and reflected from the film whereby current will be generated by said cells and be indicated on the meter for giving a visible indication as to the intensity of the light entering the camera so that more or less light may be admitted as the case may be to insure proper exposure of the film.

In testimony whereof, I affix my signature.

BEVEY A. KINSEY.